US007331406B2

(12) United States Patent
Wottreng, Jr. et al.

(10) Patent No.: US 7,331,406 B2
(45) Date of Patent: Feb. 19, 2008

(54) APPARATUS FOR CONTROLLING A FASTENER DRIVING TOOL, WITH USER-ADJUSTABLE TORQUE LIMITING CONTROL

(75) Inventors: Mathias Wottreng, Jr., Cincinnati, OH (US); Gary Michael Bohart, Cincinnati, OH (US)

(73) Assignee: DuraSpin Products LLC, Cincinnati, OH (US)

( * ) Notice: Subject to any disclaimer, the term of this patent is extended or adjusted under 35 U.S.C. 154(b) by 0 days.

(21) Appl. No.: 11/106,299

(22) Filed: Apr. 14, 2005

(65) Prior Publication Data

US 2005/0279197 A1 Dec. 22, 2005

Related U.S. Application Data

(60) Provisional application No. 60/581,540, filed on Jun. 21, 2004.

(51) Int. Cl.
*B23Q 5/08* (2006.01)
*B23Q 5/28* (2006.01)

(52) U.S. Cl. .......................................... 173/176; 173/2

(58) Field of Classification Search .................... 173/2, 173/5, 6, 176; 227/2, 4, 29, 136, 137, 48; 81/433, 434, 57.1, 469
See application file for complete search history.

(56) References Cited

U.S. PATENT DOCUMENTS 4,014,488 A 3/1977 Potucek et al.
4,404,877 A 9/1983 Mizuno et al.
4,774,863 A 10/1988 Geist
5,014,793 A * 5/1991 Germanton et al. ........ 173/181
5,083,483 A 1/1992 Takagi
5,109,738 A 5/1992 Farian et al.
5,144,870 A * 9/1992 Nick .......................... 81/434
5,167,174 A 12/1992 Fujiyama et al.
5,337,636 A 8/1994 Shea
D358,749 S 5/1995 Matsunaga et al.
5,473,965 A 12/1995 Chen (Continued)

FOREIGN PATENT DOCUMENTS

AU 27254/77 1/1979

(Continued)

OTHER PUBLICATIONS

International Search Report, PCT/US2005/020889, 14 pages (Jun. 13, 2005).

(Continued)

*Primary Examiner*—Rinaldi I. Rada
*Assistant Examiner*—Nathaniel Chukwurah
(74) *Attorney, Agent, or Firm*—Frederick H. Gribbell

(57) ABSTRACT

An improved hand-held fastener driving tool is provided with an adjustable torque limiting control. The tool is portable, and is electrically powered using either a battery pack or a power cord as a power source. The tool drives collated fasteners (e.g., screws) into solid objects. The motor current is measured to determine the amount of torque being applied to a screw by the motor and mechanical drive components. As the screw bottoms out, the motor torque increases to a point where it exceeds the user-adjusted torque limiting control. The motor is automatically turned off at that point, thereby preventing the screw from being stripped.

6 Claims, 9 Drawing Sheets

U.S. PATENT DOCUMENTS

| | | | |
|---|---|---|---|
| D368,216 | S | 3/1996 | Hattori |
| 5,687,624 | A | 11/1997 | Tsuge et al. |
| 5,715,982 | A | 2/1998 | Adachi |
| 5,772,096 | A | 6/1998 | Osuka et al. |
| 5,810,239 | A | 9/1998 | Stich |
| 5,988,026 | A | 11/1999 | Reckelhoff et al. |
| 6,016,946 | A | 1/2000 | Phillips et al. |
| D420,877 | S | 2/2000 | Schultz |
| D420,879 | S | 2/2000 | Watson et al. |
| 6,045,024 | A | 4/2000 | Phillips |
| 6,158,643 | A | 12/2000 | Phillips |
| D436,511 | S | 1/2001 | Hayakawa |
| 6,179,192 | B1 | 1/2001 | Weinger et al. |
| D438,079 | S | 2/2001 | Hattori |
| D462,001 | S | 8/2002 | Bohart et al. |
| 6,518,719 | B1 | 2/2003 | Suzuki et al. |
| 2002/0100347 | A1 | 8/2002 | Daubinger et al. |

FOREIGN PATENT DOCUMENTS

| | | |
|---|---|---|
| DE | 41 19 925 | 1/1992 |
| DE | 42 08 715 | 9/1992 |
| DE | 195 26 543 | 1/1996 |
| EP | 0 058 986 | 9/1982 |
| EP | 0 623 426 | 11/1994 |
| WO | WO 98/10900 | 3/1998 |

OTHER PUBLICATIONS

Sales brochure of Senco Products, Inc. (2002), 2 pages.

* cited by examiner

APPARATUS FOR CONTROLLING A FASTENER DRIVING TOOL, WITH USER-ADJUSTABLE TORQUE LIMITING CONTROL

CROSS-REFERENCE TO RELATED APPLICATIONS

The present application claims priority to provisional patent application Ser. No. 60/581,540, titled "AUTO FEED/SINGLE FEED CORDLESS SCREW DRIVING TOOL WITH ELECTRONIC TORQUE CONTROL," filed on Jun. 21, 2004.

TECHNICAL FIELD

The present invention relates generally to hand-held fastener driving equipment and is particularly directed to an electrically powered portable fastener driver tool of the type which drives collated fasteners into solid objects. The invention is specifically disclosed as a fastener driving tool with an electronic torque limiting control that is adjustable by a user. Such a tool would not necessarily need a depth of drive control, since the torque will increase as the fastener bottoms out, and the tool's control circuit will automatically turn the motor off when that occurs.

BACKGROUND OF THE INVENTION

Hand-held fastener driving tools have been available for use with collated strips of fasteners, such as screws. Some conventional collated strip screw driving tools have a front or nose portion that is permanently attached to the main body of the tool, and this nose portion is pressed against a surface that the fastener will be driven into. The nose portion has an indexing mechanism to index the position of the collated strip to the next screw that will be driven. Such tools typically have a depth of drive user adjustment, to control how far the fastener or screw will be driven into the solid object by the tool.

Other types of conventional fastener driving tools use an attachment that is placed over a portable electrical tool, such as a drill or a screw driving tool, and this attachment allows the other portable tool to be used with a collated strip of screws (or other type of fasteners). The conventional attachment includes a movable nose piece that is pressed against the solid surface, and typically would have some type of depth of drive user control.

In the conventional self-contained screw driving tools, the entire nose portion is not easily detached from the main body of the tool, and an example of such a construction is disclosed in U.S. Pat. No. 5,988,026, co-assigned to Senco Products, Inc. of Cincinnati, Ohio. A detachable nose portion may have certain advantages, and a torque limiting control circuit could be used in place of a depth of drive control for such a configuration.

In some conventional self-contained screw driving tools (both single-feed and automatic-feed with a collated strip), a maximum torque control is provided, but it is a mechanical device that disengages a clutch or uses another type of mechanical drive component (e.g., a ratchet), and it does not shut off the electric motor. Therefore, a user could continue to "drive" the fastener (to make sure that it is really bottomed) and drain the tool's battery power source, by spinning the motor even though the mechanical drive is essentially not further tightening the fastener. Moreover, such a ratchet tends to make considerable acoustic noise when this occurs. Finally, most mechanical torque control devices are not all that repeatable in limiting the maximum torque applied to the fastener.

SUMMARY OF THE INVENTION

Accordingly, it is an advantage of the present invention to provide a hand-held fastener driving tool for use with collated fasteners, which includes a user-adjustable torque limiting control that interrupts current flow to the motor.

It is another advantage of the present invention to provide a portable hand-held fastener driving tool that includes a detachable nose sub-assembly, and which has a user-adjustable torque limiting control.

It is a further advantage of the present invention to provide a hand-held fastener driving tool for use with collated fasteners, which provides a user-adjustable torque limiting control circuit that also detects false readings in motor current and can continue to drive the fastener until it bottoms out, even when a false reading occurs.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a portable fastener-driving tool is provided, which comprises: (a) a housing containing an electric motor, the housing having a driving end that has a fastener driving mechanism proximal thereto, for receiving a collated strip of fasteners and moving a fastener of the collated strip of fasteners to a driving position, the motor providing power to the fastener driving mechanism; (b) a user-adjustable torque-limiting control device; and (c) a controller circuit that is configured: (i) to determine an amount of torque being generated by the motor, while actuating one of the fasteners in the driving position; (ii) to determine a state of the user-adjustable torque-limiting control device; and (iii) to compare the determined amount of torque generated by the motor with the determined state of the user-adjustable torque-limiting control device, and to turn off the motor when the determined amount of torque generated by the motor indicates that the fastener being driven has been sufficiently tightened, based on the determined state of the user-adjustable torque-limiting control device; thereby terminating a fastener driving event.

In accordance with another aspect of the present invention, a portable fastener-driving tool is provided, which comprises: (a) a housing containing an electric motor, the housing having a guide rail portion that receives a collated strip of fasteners and directs them toward a driving end of the housing, the driving end of the housing having a fastener driving mechanism proximal thereto that receives the collated strip of fasteners from the guide rail portion and moves a fastener of the collated strip of fasteners to a driving position, the motor providing power to the fastener driving mechanism; (b) an adjustable torque-limiting control device, the torque-limiting control device being set to a predetermined state by a user; and (c) a controller circuit that is configured to compare an amount of torque being generated by the motor to the predetermined state of the torque-limiting control device, and to turn off the motor when amount of torque is greater than or equal to the predetermined state of the torque-limiting control device.

In accordance with yet another aspect of the present invention, a portable fastener-driving tool is provided, which comprises: (a) a housing containing an electric motor, the housing having a first end and a second end, the housing including a first intermediate drive device that translates movement from the motor toward the second end; (b) a detachable nose sub-assembly having a third end and a fourth end, in which the third end is positioned proximal to the second end of the housing when attached thereto, the third end including a second intermediate drive device that in is mechanical communication with the first intermediate drive device when the housing is attached to the detachable nose sub-assembly, the fourth end of the nose sub-assembly including a fastener driving mechanism that is in mechanical communication with the second intermediate drive device, used for driving a fastener into an object; (c) an adjustable torque-limiting control device, the torque-limiting control device being set to a predetermined state by a user; and (d) a controller circuit that is configured to compare an amount of torque being generated by the motor to the predetermined state of the torque-limiting control device, and to turn off the motor when amount of torque is greater than or equal to the predetermined state of the torque-limiting control device.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
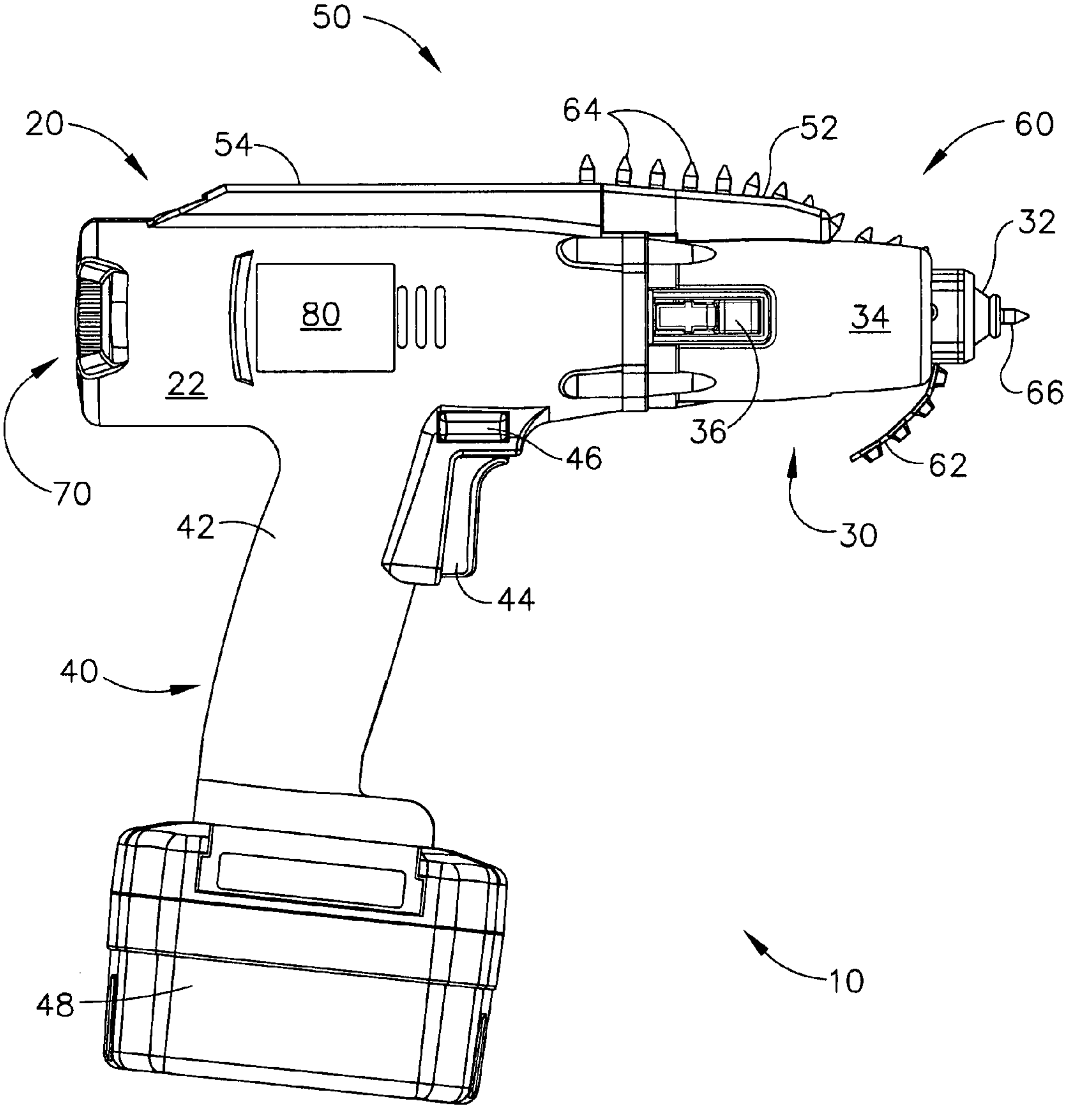
FIG. 1 is a side elevational view of a hand-held screw driving tool that has a detachable nose sub-assembly, and a user-adjustable torque limiting control, as constructed according to the principles of the present invention.

Referring now to the drawings, FIG. 1 shows a hand-held screw driving tool, generally designated by the reference numeral 10, which includes a housing portion 20, a nose member sub-assembly (S/A) 30, a handle portion 40, and a screw feed "guide rail" portion 50. The tool 10 is designed for use with a flexible strip of collated screws, generally designated by the reference numeral 60. The collated strip of screws 60 have individual screws 64, mounted in a flexible plastic strip 62, and the front-most screw will be positioned for actual insertion into a solid object when it is placed at a driving position 66. It will be understood that the present invention can be used with many types of fasteners, including both screws and bolts, for example.

The housing portion 20 of tool 10 includes an outer shell housing structure 22 which is mated to the nose member sub-assembly 30. In tool 10, the nose member S/A is detachable from the overall tool body, essentially made up of the housing portion 20 and the handle portion 40. Handle portion 40 includes a gripable surface 42 for use by a user's hand, a trigger switch actuator 44, and a reversing switch actuator lever 46. Handle portion 40 also has a detachable battery sub-assembly 48 in this version of tool 10.

The nose member sub-assembly 30 includes a front-most nose piece 32 and a housing portion having a side wall 34. A latch sub-assembly 36 is used to attach and hold the nose member sub-assembly 30 in place against the housing portion 20 that is part of the main body of the tool 10. When the nose member sub-assembly 30 is attached to the housing portion 20, the guide rail portion 50 becomes a complete guiding feature for use with a collated strip of screws. In actuality, the guide rail portion 50 is composed of two separate portions: a front portion 52 that is part of the nose member sub-assembly 30, and a rear portion 54 that is part of the main body, and which is attached to or integral with the housing portion 20. In an exemplary embodiment of the tool 10, the rear portion 54 of the guide rail is manufactured along with the top area of the outer housing (or case) of housing portion 20.

Figure 9:
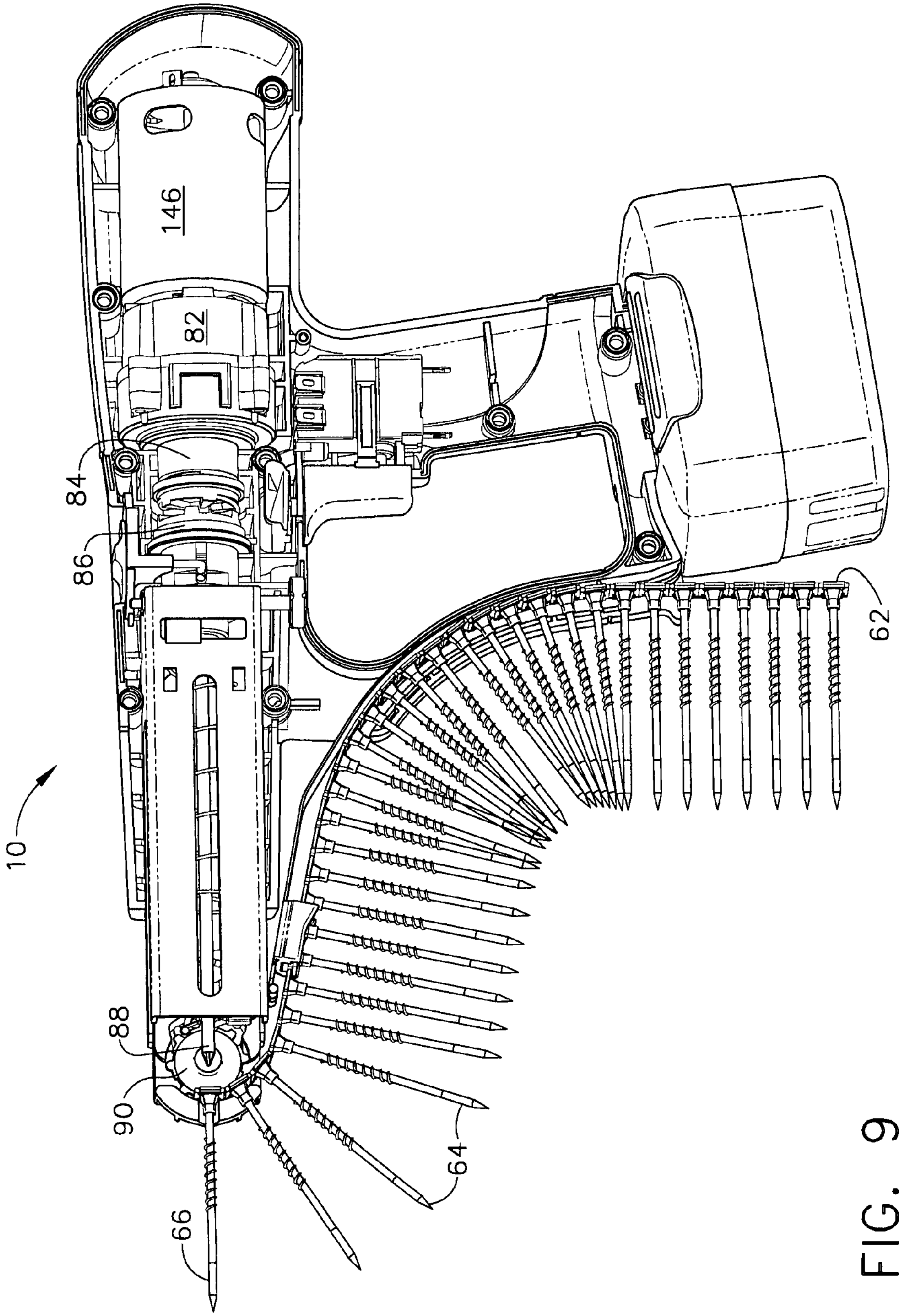
FIG. 9 is a side elevational view in partial perspective, showing a screw driving tool of the present invention, in a partial cross-section view.

Referring now to FIG. 9, some of the internal components of the portable screw driving tool 10 are illustrated. An electric motor 116 is positioned within the housing at the rear-most portion of the tool 10. Motor 116 drives into a gearbox 82, which in turn drives a clutch drive member 84. A clutch driven member 86 is selectively engaged by the clutch drive member 84 when it is time to drive a screw.

When viewing the tool at its front-most portion (i.e., the left-hand portion as viewed in FIG. 9), it can be seen that one of the screws has been indexed to a "drive" position at 66 and is now co-linear with the main drive components of the portable tool 10. As the collated screw sub-assembly 60 is moved through the various "guided" pathways, the plastic strip 62 will eventually make contact with a sprocket 90 that acts as a rotary indexer, which moves each of the portions of the plastic strip 62 into a proper position so that their attached screw 64 eventually ends up in the front-most drive position 66.

When the nose piece 32 (not seen in FIG. 9) is actuated by being pressed against a workpiece (not seen in FIG. 9), then a drive bit 88 will move in a linear fashion to push the screw at 66 into the workpiece, and the drive bit 88 will also then be turned in a rotary motion to twist the screw at 66 in the normal manner for driving a screw 64 into a solid object. Once the screw at 66 has been successfully driven into the solid object, then the tool 10 is withdrawn from the surface of the solid object, and of course the screw 64 remains behind and has broken free from the plastic strip 62. The tool 10 is now free to allow the sprocket 90 to perform its rotary indexing function and to bring forth the next screw 64 into the front-most drive position. This type of screw-feed actuation can be referred to as "indexed on return," since the "lead screw" is moved into the "firing position" at 66 as the nose piece 32 is released (or "returned") from the surface of the workpiece.

The screw driving tool 10 of the present invention also includes a user-settable torque limiting control, which as a sub-assembly is generally designated by the reference numeral 70 on FIG. 1. This will be described below in greater detail. In addition, further user controls can be provided as optional features of the tool 10, in which the further user controls could be located at an area 80 on the side wall 22 of the housing portion 20. Such optional user controls could be located virtually anywhere on the tool, if desired, including on outer areas of the handle portion 40, for example. Such additional or optional controls are further discussed below in greater detail.

Figure 2:
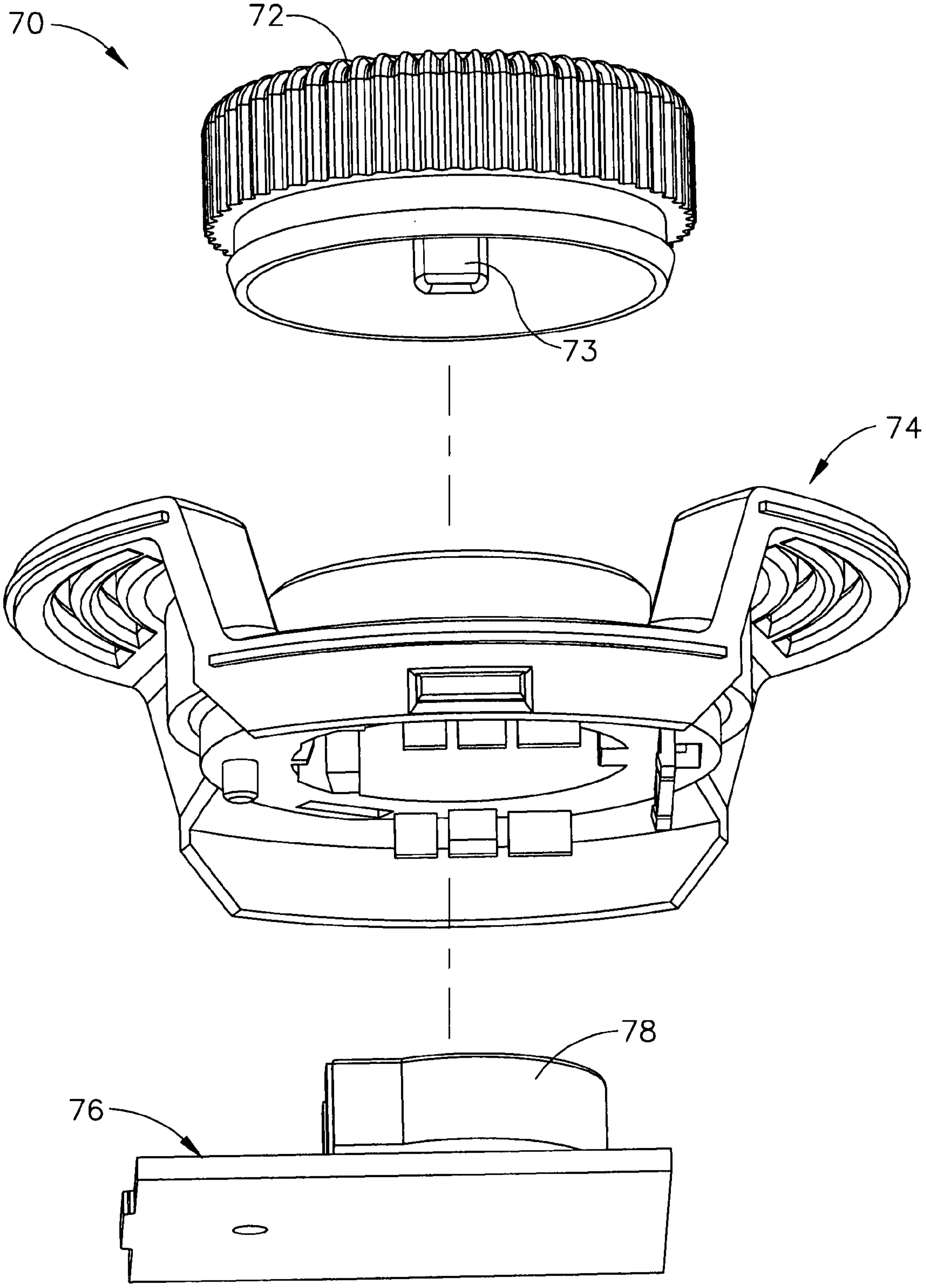
FIG. 2 is a perspective view of a torque limit adjustable dial sub-assembly used with the tool of FIG. 1.
Figure 3:
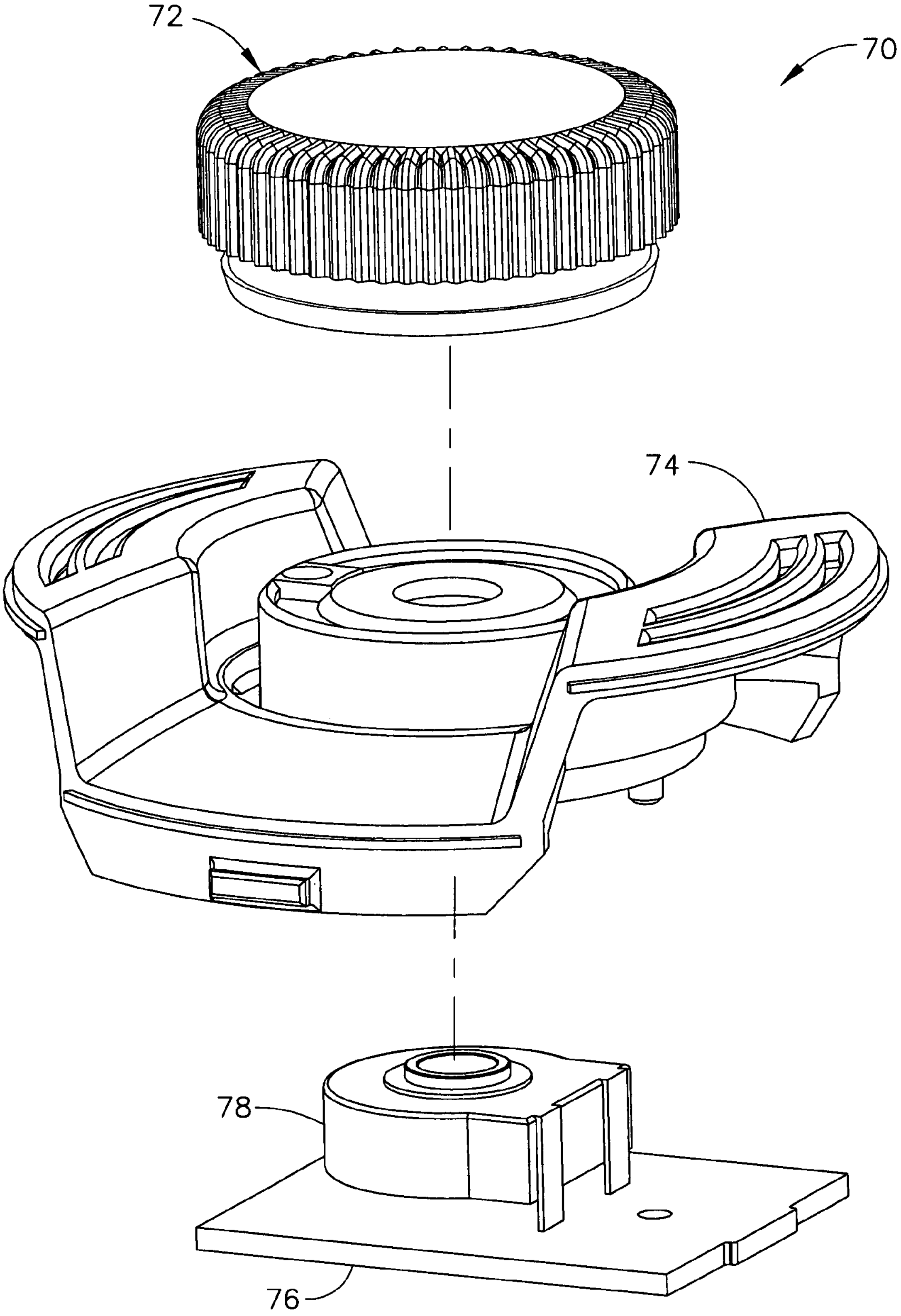
FIG. 3 is a perspective view from a different angle of the torque limit adjustable dial sub-assembly of FIG. 2.

Referring now to FIGS. 2 and 3, the torque control sub-assembly 70 is illustrated in greater detail. A user-actuatable dial or wheel 72 is mounted into a torque wheel housing 74. This housing 74 covers a printed circuit board 76 which has a potentiometer 78 mounted thereon. In this embodiment, the electrical component used as an input device for the user torque-limit setting is the potentiometer 78, which is rotated by a stem portion 73 that is part of the adjustment wheel or dial 72. Certainly other types of mechanical and/or electrical components could be used as the input device for the torque limit setting that can be actuated by a user. For example, an optical sensor could be used with some type of slotted encoder wheel, or perhaps a magnetic pickup sensor could be used if the wheel has either magnetic or soft iron metal characteristics. In an exemplary embodiment of the present invention, the torque limiting feature will comprise an electrical circuit rather than a mechanical device.

Figure 4:
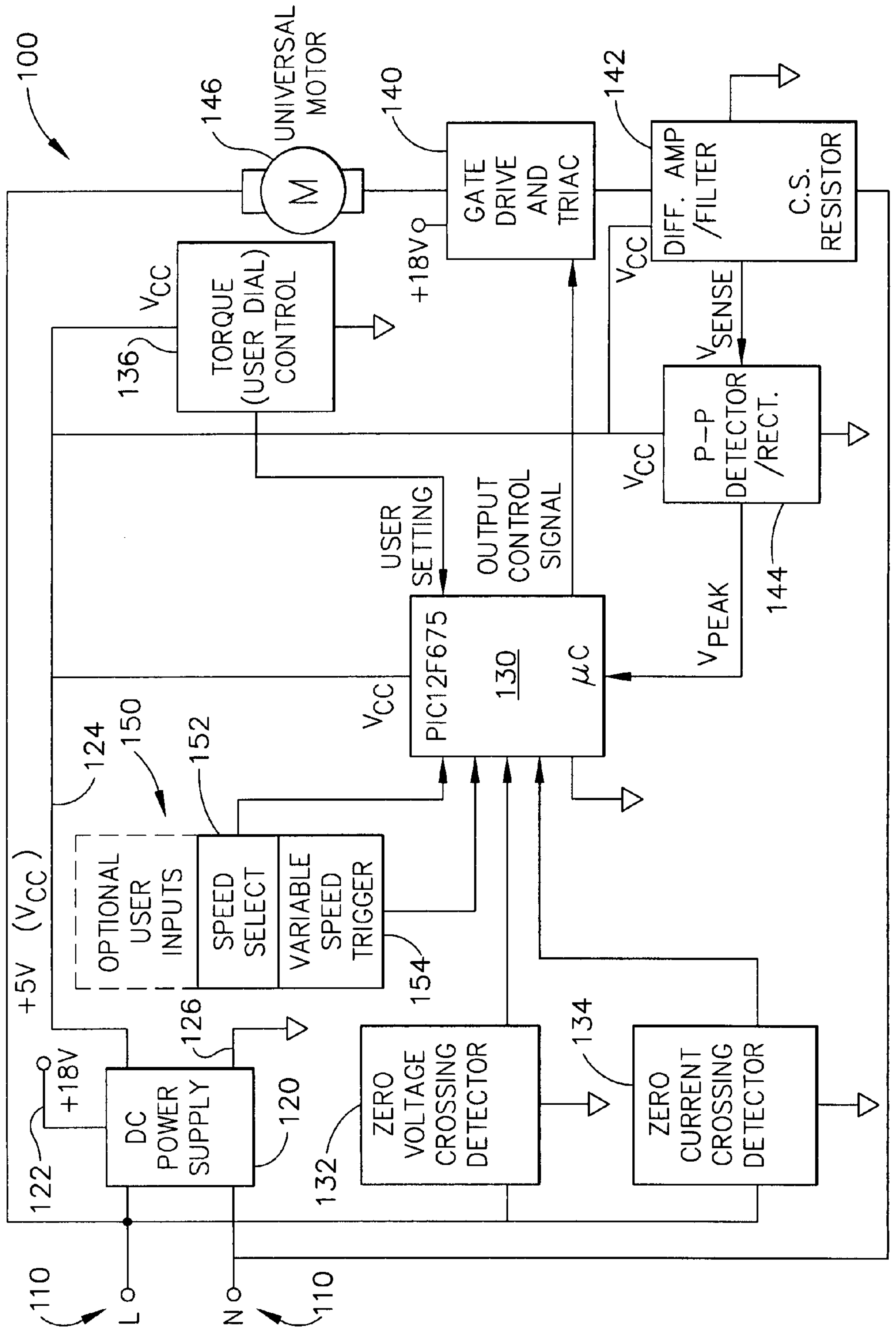
FIG. 4 is a block diagram of some of the major hardware components that are used in the torque limiting control circuit of the tool of FIG. 1.

Referring now to FIG. 4, a hardware block diagram generally designated by the reference numeral 100 depicts some of the major electrical or electronic circuits used in the tool 10 of the present invention. In this block diagram 100, it is assumed that the electrical power source for the tool 10 will be alternating current, which comes in at a line terminal ("L") and a neutral terminal ("N"), in which both terminals are generally designated at the reference numeral 110. This line voltage could be the European standard voltage of 220 volts AC, 50 Hz, or it could be the standard United States line voltage 120 VAC, 60 Hz, single phase. It should be noted that, in some embodiments of the present invention, a DC power source such as a battery can be used, rather than AC line voltage.

The line voltage is directed to a DC power supply circuit 120, which has a +5 volt DC output supply rail at 124, also referred to herein as Vcc. A second DC voltage can be used in some portions of the circuit, and this second DC voltage is at the reference numeral 122, and is designated +18 volts DC. There is also a DC common 126.

The line voltage is also directed to a zero voltage crossing detector 132, and also a zero current crossing detector 134. The outputs of these two circuits are directed to a processing circuit 130. Not all embodiments of the present invention need to use both a zero voltage crossing circuit and a zero current crossing circuit.

The torque limit control device is depicted at the reference numeral 136, which is equivalent to the potentiometer 78 depicted on FIGS. 2 and 3. As noted above, a different type of user input control could be used, if desired, without departing from the principles of the present invention. When using a potentiometer for the torque control 136, the variable output is a "User Setting" signal that is directed to the processing circuit 130. This User Setting signal provides an indication to the processing circuit as to what the user desires for the maximum torque that can be generated by the tool 10. Once that maximum torque is achieved, the processing circuit 130 will turn the tool's motor off, and stop driving the screw into the solid object.

The processing circuit 130 acts as the system controller, and it will output a control signal that controls the power being provided to a motor 146 that drives the fastener of the tool 10. In the block diagram 100, the processing circuit 130 knows the amount of effective torque being generated by the tool motor 146 by detecting the current running through that motor 146. A current sensing resistor is used to provide a differential voltage to a differential amplifier and filter circuit, generally designated by the reference numeral 142. The output signal of this amplifier/filter circuit 142 is a signal $V_{SENSE}$, which is directed to a peak-to-peak detector and rectifier circuit 144. The output signal of this peak-to-peak detector circuit 144 is a signal $V_{PEAK}$, which signal is directed to the processing circuit 130. Now the processing circuit 130 has the information it needs to determine whether the actual torque generated by the motor 146 has reached the desired torque limit that was set by the user control 136.

The processing circuit 130 generates an Output Control Signal to control a gate drive circuit with a triac output stage, all generally designated by the reference numeral 140. This output stage directly controls the current flowing through the motor 146. As the screw being driven bottoms out, the motor torque will increase. When the measured motor torque instantaneously reaches or exceeds the User Setting indication signal from the torque control input device 136, then the processing circuit 130 will automatically terminate the current flowing through the output stage at 140 and into the motor 146. This action essentially prevents the screw from being stripped.

Other user inputs can be provided as options, generally designated by the reference numeral 150 on FIG. 4. For example, the motor 146 could be a constant speed device, or it could be a multiple speed device that has several different speed settings. A control device at 152 could act as a speed select for a user to indicate to the system controller which of the multiple speeds should be used. This information would be directed to the system controller which includes the processing circuit 130.

Another possible optional input would be to control a variable speed drive if the system designer provides a variable speed motor controller. The processing circuit 130 could act as a variable speed controller if the gate drive and output stage circuit 140 were designed to provide a variable current and/or voltage, which could also represent a chopped waveform output device. In that situation, the user input device could be a variable speed trigger, designated at the reference numeral 154. This variable speed trigger could comprise a potentiometer, for example, or some other type of device such as an optical encoder or a linear variable resistor. This signal would be directed to the system controller which includes the processing circuit 130.

For many, if not most, user applications for driving fasteners into solid objects, the instantaneous control response would not necessarily need to be any faster than one half-cycle of a 60 Hz or a 50 Hz AC line voltage waveform. That is assumed to be the case for an exemplary embodiment of the present invention. In that situation, the current supplied to the motor 146 could be "chopped" into entire half-cycles, which means that each sine wave half-cycle could be started at a zero crossing and terminated at a zero crossing, to reduce the electromagnetic interference (EMI) that is generated by the switching of the motor current.

In the embodiment 100, both a zero voltage crossing detector 132 and a zero current crossing detector 134 are provided. This offers maximum flexibility for the system designer, who may decide to start the drive current at either the zero voltage crossing or the zero current crossing, whichever may produce the lesser amount of interference (EMI). The same is true with interrupting the motor current, which could be stopped at either a zero voltage crossing or a zero current crossing of the sine waveform. It will be understood that only one of these types of zero crossing detectors need be provided, if the system designer decides that the tool only requires knowledge of zero voltage crossings or zero current crossings, for example.

For an inductive load, such as a motor, the zero voltage crossings will occur just before the zero current crossings in real time, due to the power factor. In an exemplary embodiment of the present invention, a zero voltage crossing event essentially informs the system controller (e.g., processing circuit 130) that a zero current crossing will occur shortly, and the controller will switch ON or switch OFF the motor current, if desired, at the appropriate zero current crossing occurrence. In this manner, the controller can introduce a small time delay after the zero voltage crossing before commanding a change of state in the current flow through the triac output stage 140, and the actual switching event will occur at or near a zero current crossing of the AC motor current.

Figure 5:
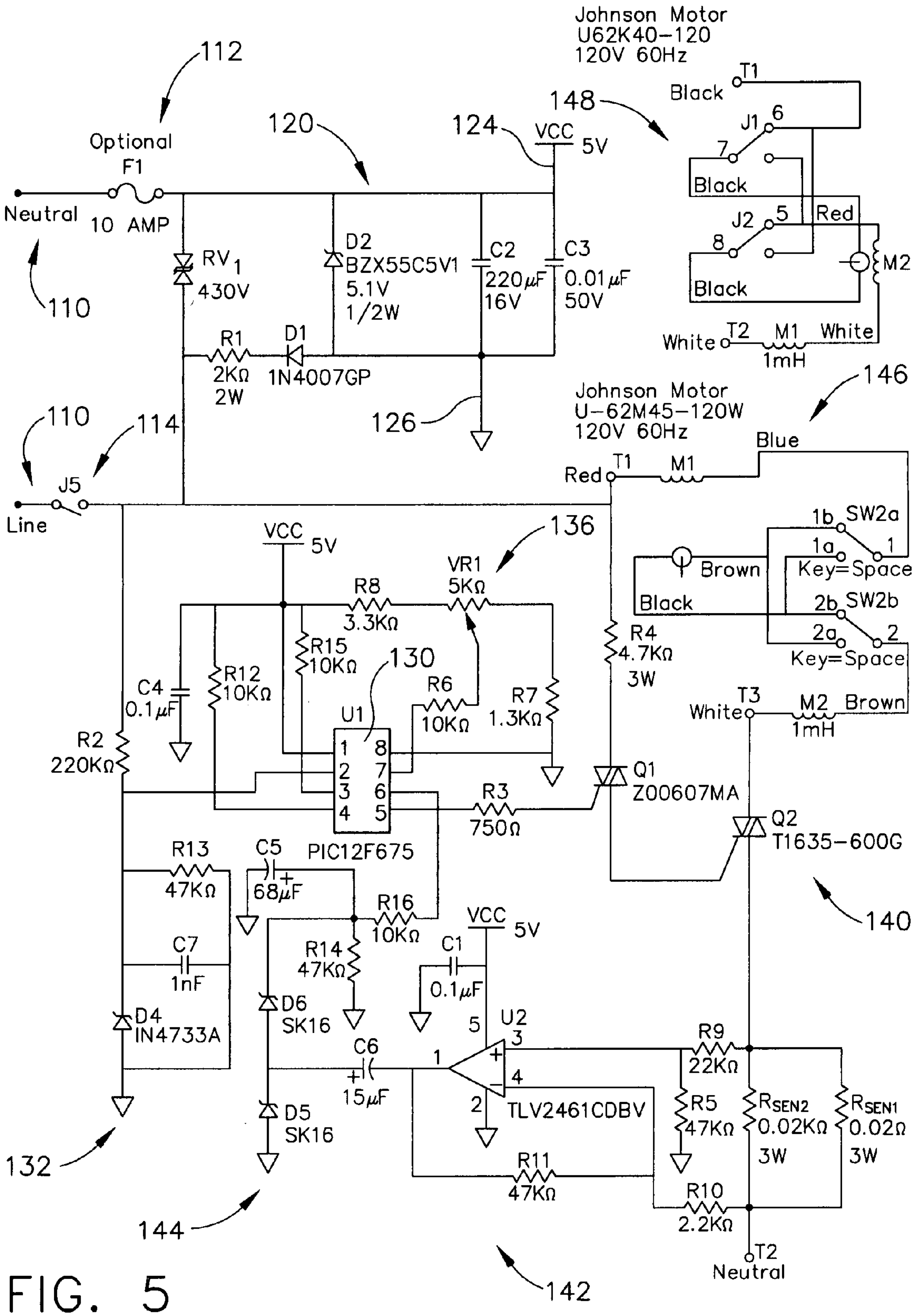
FIG. 5 is an electrical schematic diagram of a torque limiting control circuit used for the tool of FIG. 1.

Referring now to FIG. 5, an electrical schematic diagram illustrates an exemplary circuit that can be used with the tool 10 of the present invention. The incoming electrical power is envisioned as line voltage at 110, including a hot lead and a neutral lead, which are depicted as arriving at a fuse F1 designated by the reference numeral 112, and an ON-OFF switch J5 designated by the reference numeral 114. The line voltage 110 can be the standard U.S. line voltage of 120 volts AC, 60 Hz, single phase, or perhaps the standard European voltage of 220 volts, 50 Hz, single phase.

This incoming power is directed to a DC power supply, generally designated by the reference numeral 120. Power supply 120 includes a metal oxide varistor RV1, a resistor R1, diode D1, zener diode D2, filter capacitor C2, and bypass capacitor C3. The output voltage supply rail across C3 is approximately 5 volts DC, generally designated at the reference numeral 124. The "negative" voltage rail is considered DC common at 126.

In the schematic diagram on FIG. 5, the processing circuit 130 is designated U1, which is a microcontroller integrated circuit device. In this example, the microcontroller is a part number PIC12F675, manufactured by Microchip Corporation. It will be understood that virtually any type of microcontroller chip could be utilized in the present invention, including a separate microprocessor circuit along with separate memory chips and other types of input/output interface circuitry. The numbers 1-8 concerning U1 represent the pin-outs of that integrated circuit device.

On FIG. 5, the zero voltage crossing detector 132 includes the following components: R2, R13, C7, and D4. The output signal line from this circuit 132 is directed as an input to the microcontroller U1.

On FIG. 5, the zero current crossing detector is performed in software on-board the microcontroller chip U1. This is a designer's choice, and the zero current crossing detector could be represented by a hardware circuit instead of using a software algorithm, without departing from the principles of the present invention. In an exemplary embodiment of the present invention, the motor current is detected by the "sense" resistors $R_{SEN1}$ and $R_{SEN2}$, as described below, and the microcontroller U1 can use that information to determine the zero current crossing occurrences.

The electrical circuit depicted in FIG. 5 has been constructed in prototypical form using two different motors, and the first motor at 146 is a part number U-62M45-120W, manufactured by Johnson. This type of motor was used in a fastener driving tool for use with metal decking. On FIG. 5, the field coils of this motor are designated M1 and M2. Their electrical connections are shown on FIG. 5, in which the motor's red wire is at T1, and the motor's white wire is at T3 on this schematic diagram of FIG. 5.

The output drive circuit 140, including the gating signal circuit, is made up of the following components on FIG. 5: R4, R3, Q1, and Q2. The motor current flows through high-current semiconductor switches, such as the triacs Q1 and Q2. The switch SW on FIG. 5 is a reversing switch, which allows the user to control the direction of rotation of the fastener, by use of the reversing lever 46 (see FIG. 1).

The torque limit control input circuit 136 comprises the following components on FIG. 5: R8, R6, R7, and VR1. VR1 is the potentiometer 78 on FIG. 2.

The current sense and differential amplifier/filter circuit 142 comprises the following components on FIG. 5: $R_{SEN1}$, $R_{SEN2}$, R9, R5, R10, R11, and an op-amp stage, which is an integrated circuit U2. The current running through the motor and the triac Q2 also flows mainly through the two "Sense" resistors, which are relatively high-wattage resistors and which exhibit relatively low Ohmic values. The voltage across these two Sense resistors is amplified by the op-amp U2, to produce a signal that is used by the peak-to-peak detector circuit 144.

On FIG. 5, the components that make up the peak-to-peak detector 144 are as follows: C6, D5, D6, C5, R14, and R16. The signal that is output from this circuit 144 is directed to the microcontroller device U1.

The schematic diagram of FIG. 5 includes some decoupling capacitors at C4 and C1. The resistors R12 and R15 act as pull-up resistors, which set the microcontroller U1 into a specific mode that is used for the purposes of the present invention.

A second motor 148 can be connected into the circuit depicted in FIG. 5. This motor is a part number U62K40-120, manufactured by Johnson. When using this motor, its black lead is connected to T1 of the circuit of FIG. 5, while its white lead is connected to T2. A reversing switch is connected as depicted on the diagram. This second motor was used in a prototype hand-held screw driving tool.

Figure 6:
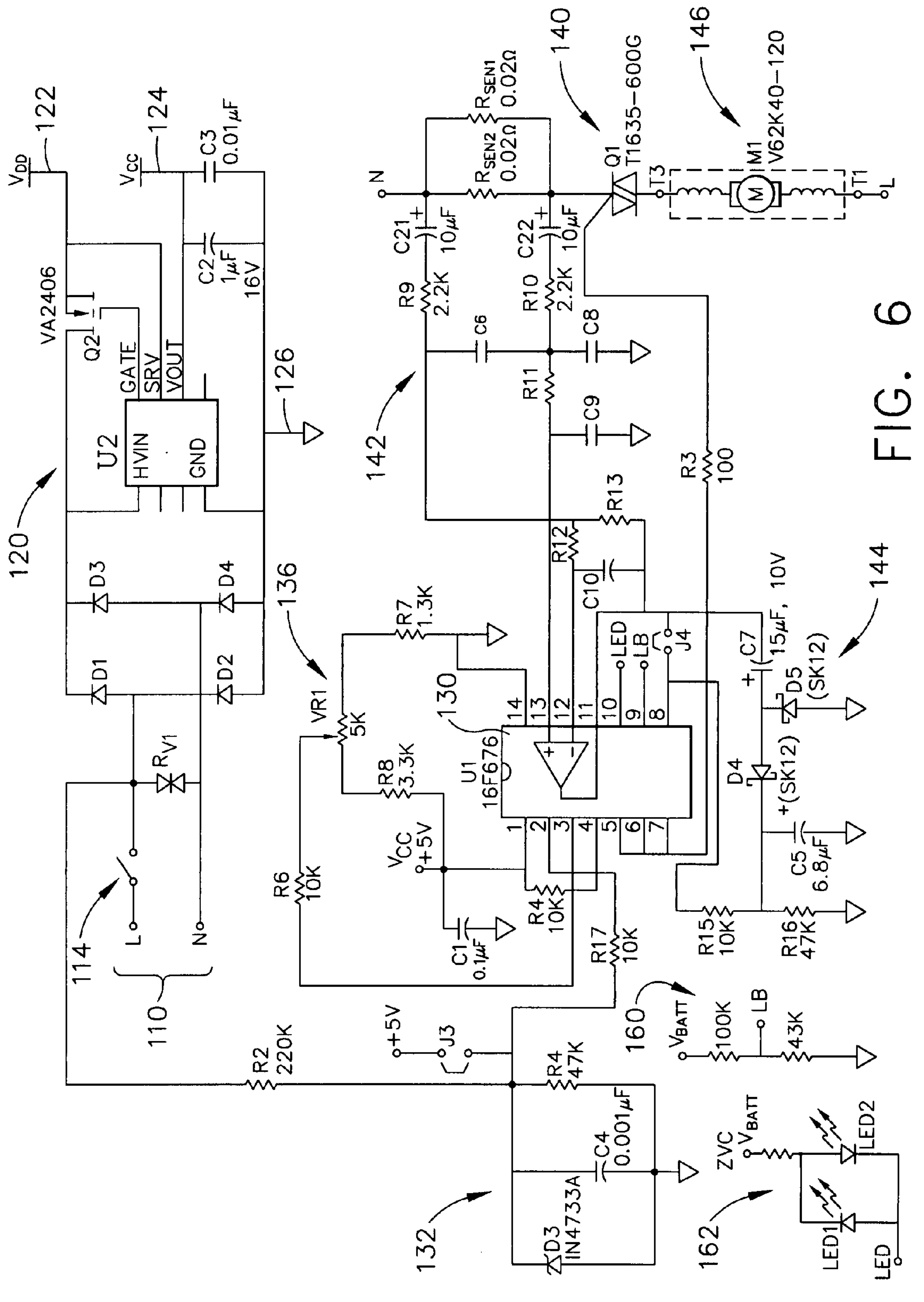
FIG. 6 is an electrical schematic diagram of an alternative torque limiting control circuit used in the tool of FIG. 1.

An alternative electronic circuit is depicted in a schematic diagram on FIG. 6, usable with the present invention. This circuit diagram of FIG. 6 uses less components, and thus may be more suitable for a production unit. Starting with the reference numeral 110, the incoming line voltage arrives at the terminals L and N, through a switch 114. A metal oxide varistor RV1 is used to help clamp the line voltage for possible voltage surges. A DC power supply 120 is included, and includes a full bridge rectifier made up of diodes D1-D4, a voltage regulator chip U2, and a filter capacitor C2 and a bypass capacitor C3, which generates a +Vcc power supply rail, at +5 VDC. Vcc is at 124, and the DC common is at 126. A relatively high-current MOSFET transistor Q2 is used to provide a higher voltage supply rail at 122, referred to as VDD.

The line voltage is directed to a zero voltage crossing circuit 132, through a resistor R2. The zero voltage crossing circuit 132 comprises the following components on FIG. 6: R4, R17, C4, and D3. The signal generated by this circuit 132 is directed to the microcontroller U1 as an input signal. The circuit of FIG. 6 also allows for the use of a tool that is powered by a DC device, such as a battery (e.g., from the battery pack 48 on FIG. 1). In that situation, a jumper will be installed at J3, which will bypass the zero voltage crossing circuit 132. If such a DC power source is used, then that DC voltage will be provided directly to the terminals L and N, at 110 on FIG. 6. When used with a DC power source, R17 acts as a current-limiting resistor.

In the situation where a battery is used as the electrical power source for the tool 10, then a battery voltage sensing circuit can be provided, as well as a low battery indicator circuit. The battery voltage sensing circuit is designated by the reference numeral 160 on FIG. 6, and provides an output signal "LB" which is directed as an input to the processing circuit 130. Processing circuit 130 also has an output signal "LED" which is directed to a low battery voltage indicator circuit 162 on FIG. 6. If desired, the indication circuit can have a multiple indication-style LED, in which the direction of the current could determine which color is displayed by the LED, such as red and green, or yellow and red, to thereby indicate more than one state of the battery voltage.

In the circuit diagram of FIG. 6, the processing circuit 130 is a part number 16F676, which is a different microcontroller that is in a 14-pin DIP package, designated U1. The numerals 1-14 on the drawing at this device U1 represent the pin-outs for that particular integrated circuit device.

The user adjustable torque limiting control 136 comprises the following components on FIG. 6: R6, R7, R8, and VR1, in which VR1 is the potentiometer 78 on FIG. 2. The analog voltage that is generated by this circuit is provided as an input to the microcontroller chip U1.

On FIG. 6, a motor M1 with its field coils is generally designated by the reference numeral 146. Motor 146 is powered through a switching semiconductor device, in this instance a triac Q1. The gate drive and output stage circuit 140 comprises the following components on FIG. 6: R3 and Q1. In this circuit, three different parallel outputs from a microcontroller (i.e., the outputs at pins 5, 6, and 7) all drive the gate of the triac Q1, to provide a sufficient amount of current to correctly drive this gate without harming the microcontroller device U1.

On FIG. 6, the current sense and amplifier/filter circuit 142 is comprised of the following components: $R_{SEN1}$, $R_{SEN2}$, R9, R10, R11, R12, R13, C21, C22, C6, C8, C9, and C10. The "sense" resistors $R_{SEN1}$ and $R_{SEN2}$ have most of the motor current flowing therethrough, from the triac Q1 to the neutral line "N".

The peak-to-peak detector circuit 144 is comprised of the following components on FIG. 6: C7, D4, D5, C5, R15, and R16. If a DC electrical power source is used instead of AC line current, then a jumper J4 would be installed, to essentially override the function of the peak-to-peak detector 144.

On FIG. 6, there is a decoupling capacitor C1 near the microcontroller U1. There is also a pull-up resistor R14 to place the microcontroller into a particular mode usable with the circuit of FIG. 6. It should be noted that the microcontroller chip U1 includes an operational amplifier stage, as depicted on FIG. 6, which has inputs at pins 12 and 13, and an output at pin 11. The pull-up resistor R14 also configures this function of the microcontroller chip U1.

Figure 7:
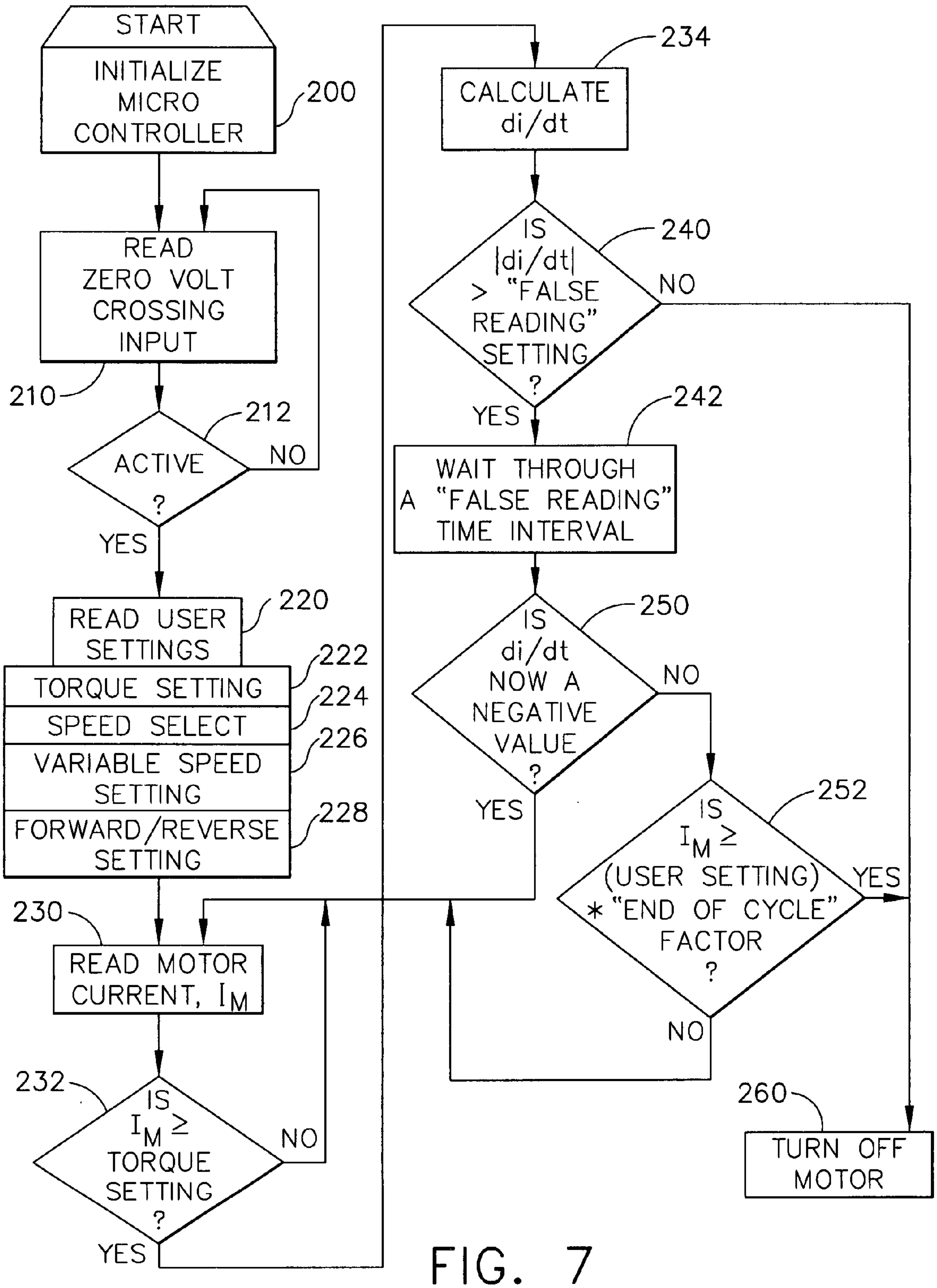
FIG. 7 is a flow chart showing some of the important logical operations used in the torque limiting control circuit of the present invention.

Referring now to FIG. 7, a flow chart is provided to show some of the important logical steps in operating a screwdriving tool of the present invention, which includes a torque limit setting and an input, and includes a torque limiting function, based on that user setting. Starting with a step 200, the microcontroller device is initialized. As noted above, it will be understood that many different types of microcontrollers could be used, or even a microprocessor could be used if it is provided with proper input/output interfacing using other devices, and separate memory chips.

A step 210 now reads the input from the zero voltage crossing circuit. A step 212 determines whether or not the circuit is currently active, based on the input signal values from the zero voltage crossing circuit. If not active, then the logic flow loops back to step 210, awaiting for the type of input that would indicate an "active" status of the tool.

Once the tool becomes active, the logic flow is directed to a step 220 that reads the present user settings. The possible settings include a torque setting at 222, a speed selection input or indication at 224, a variable speed setting or indication at 226, and a forward/reverse setting or indication at 228. As discussed above, the speed select setting 224 could be used if the tool 10 allows multiple, different constant speeds. The variable speed setting 226 would depend on the user's positioning of the trigger 44; or the variable speed setting could be automatic, depending upon the status of the tool.

If the tool operates with a variable speed drive for use with a DC motor that can run at many different speeds throughout a range of RPM of rotary motion, then a feedback device could read the current rotational speed of the output of the motor, or the speed at a different rotating shaft, on either side of the gear box or the clutch, if desired. Depending upon the instantaneous loading of the motor, the variable speed drive can be automatically controlled to either increase or decrease the present speed that the motor is currently running, if desired. This by itself could act as a torque limiting control, and a user torque limit setting would not necessarily be required when using a variable speed motor with some type of rotary motion feedback device. Other similar modes of operation could be used, without departing from the principles of the present invention.

A step 230 now reads the motor current, which is referred to as the quantity "IM". A decision step 232 now determines if the motor current IM is presently greater than or equal to the torque limit setting. If not, then the system continues to operate by powering the motor, and the logic flow loops back to the step 230, in which the motor current IM is again sampled. On the other hand, if the present motor current IM is greater than or equal to the torque setting, then the logic flow is directed to a step 234 that calculates the instantaneous derivative of the motor current, referred to herein as the quantity "di/dt".

A decision step 240 now determines if the absolute value of the derivative di/dt (from step 234) is greater than a "False Reading" setting. It should be noted that the way a user leans into the screw driving tool will possibly alter the current required by the motor when driving a screw or other type of fastener into a solid object. If the user merely holds the tool in place against the head of the screw, then the inrush current through the motor will begin to increase instantaneously as soon as the motor starts running, but will then quickly decrease and settle out at a relatively constant value while the screw is being driven. As the screw bottoms out against the surface of the solid material, then the motor current will again increase until it reaches the torque limit setting. When that occurs, it is desired for the motor to be turned off by the controller, thereby ending the fastener-driving event.

On the other hand, if the user presses or leans the screw driving tool fairly hard against the screw and the surface the screw is being driven into, then after the initial surge of current, the motor current will not necessarily settle out to a relatively constant value, but may quickly jump up above the torque limit setting. When that happens, if the screw has not actually bottomed out, then the current will likely fall fairly rapidly back toward the "normal" load current, which would typically be below the torque limit setting. Later, once the screw bottoms out, then the motor current will again increase until it reaches the torque limit setting.

If the current jumps above the torque limit setting before the screw bottoms out, this could cause a problem, in that there could be a "false peak" in the current reading which, if not accounted for, might cause the motor to turn off prematurely. The existence of such a false peak can be determined by measuring the derivative of the current versus time, which typically would not have a very high numeric value during a "normal" driving of a screw. However, if the tool is indeed being pressed vigorously against the screw being driven, then such a false peak may likely occur when the voltage ramps up fairly quickly, and the di/dt value will then likely jump above what is referred to herein as the "False Reading Setting." If that occurs, then the software will be directed to a step 242 that waits a predetermined time interval, which interval amount is selected to delay making any decisions about turning the motor off until the "false peak" condition will likely have gone away.

After waiting the time interval amount, the situation may have been rectified by the instantaneous motor current dropping below the torque limit setting. A decision step 250 determines if the value of di/dt is now a negative value, which would be an indication that the absolute magnitude of the motor current is at least moving toward a value that, either is already below the torque limit setting, or is on its way there. If the answer is YES, then it is temporarily presumed that the motor is now running at a normal current level, and that the screw has not yet bottomed out. In that situation, the logic flow is directed back to the step 230, where the motor current IM is again sampled. On the other hand, if di/dt is not a negative value at step 250, then the logic flow is directed to another decision step 252.

Referring back to decision step 240 for a moment, if the absolute value of the derivative of the motor current versus time is not greater than the False Reading Setting, then it can be determined that the motor current has arrived at the torque limit setting due to its normal situation, in which the screw has indeed bottomed out. When that occurs, it is time to turn off the motor, and so the logic flow is directed to a step 260 which turns the motor off. That would be the end of this fastener-driving event.

Now referring back to the decision step 252, if the instantaneous motor current IM is greater than or equal to the user setting (i.e., the torque setting 222) times (or plus) a predetermined "End of Cycle Factor," then it can be presumed that the screw has indeed bottomed out, but that this bottoming out situation also happened to occur at a time when the derivative di/dt was above the False Reading Setting, as determined in step 240. The motor should nevertheless be turned off in this circumstance, and so the logic flow is directed out the YES output from step 252, to the step 260.

On the other hand, if step 252 determines that the instantaneous motor current is not greater than or equal to the user torque setting plus the End of Cycle Factor, then it is temporarily presumed that the screw has not yet bottomed out, and therefore, the driving event cycle should continue. Thus the logic flow is directed back to the step 230 where the motor current IM is again sampled.

Several additional comments apply to FIG. 7: if the AC sine wave is switched at zero crossings, then there would be 120 such possible switching points per second, when using 60 Hz alternating current (or 100 such possible switching points per second at 50 Hz AC). Each of these half-cycles would be approximately 8.3 milliseconds (or 10 msec) in time duration, which is quite fast as compared to the mechanics of driving the screw into an object. The time interval for step 242 to wait through a "False Reading," could thus be one half-cycle of the sine wave. This type of methodology would also be useful if the sampling rate for reading the motor current at step 230 was set to substantially the same interval of a single half-cycle of the sine wave. So long as the motor is robust enough to withstand a current overload for at least one half-cycle of the line current, then this would be a relatively safe operating procedure for the tool 10. (Note: the sampling rate could easily be much quicker, if desired.)

The value for the False Reading Setting of step 240 will likely need to be determined empirically, because it may be different for each tool design. The False Reading Setting value may also be different for a single tool, being used with different size screws. If that is the case, then the user input data perhaps could include entering the size and/or type of screw being driven, for a more sophisticated tool model, if desired. There could be several different False Reading Settings for several different types and sizes of screws, and all of these could be stored in some type of look-up table that is accessible by the microcontroller that controls the entire tool. Such a False Reading Setting would probably not be adjustable by a user, because that might lead to a situation in which the tool's electronics and/or motor would not be effectively protected.

The End of Cycle Factor used in the step 252 would likely be a predetermined value that again would have to be empirically determined for each type of tool, and also perhaps for various conditions under which the tool operates. Such conditions could again include the screw size and screw type. It is contemplated by the inventors that the End of Cycle Factor would be a percentage above the torque setting value selected by the user, such as 25% above that torque limit setting. Some type of number should be used that will indicate that the screw has actually bottomed out, yet is also high enough that there will not be repeated premature stoppages of the motor. The way that a user uses the tool may cause a higher than normal motor current to briefly or instantaneously occur, but if the End of Cycle Factor is too low, this may prevent that motor current from being considered a False Reading, and the End of Cycle Factor may effectively be ignored by the controller. If the user is quite vigorous in pressing the tool against the driven surface, then perhaps an indicator or a display could be provided as an option, to inform the user that the tool cannot be used in that manner on a repeated basis.

Figure 8:
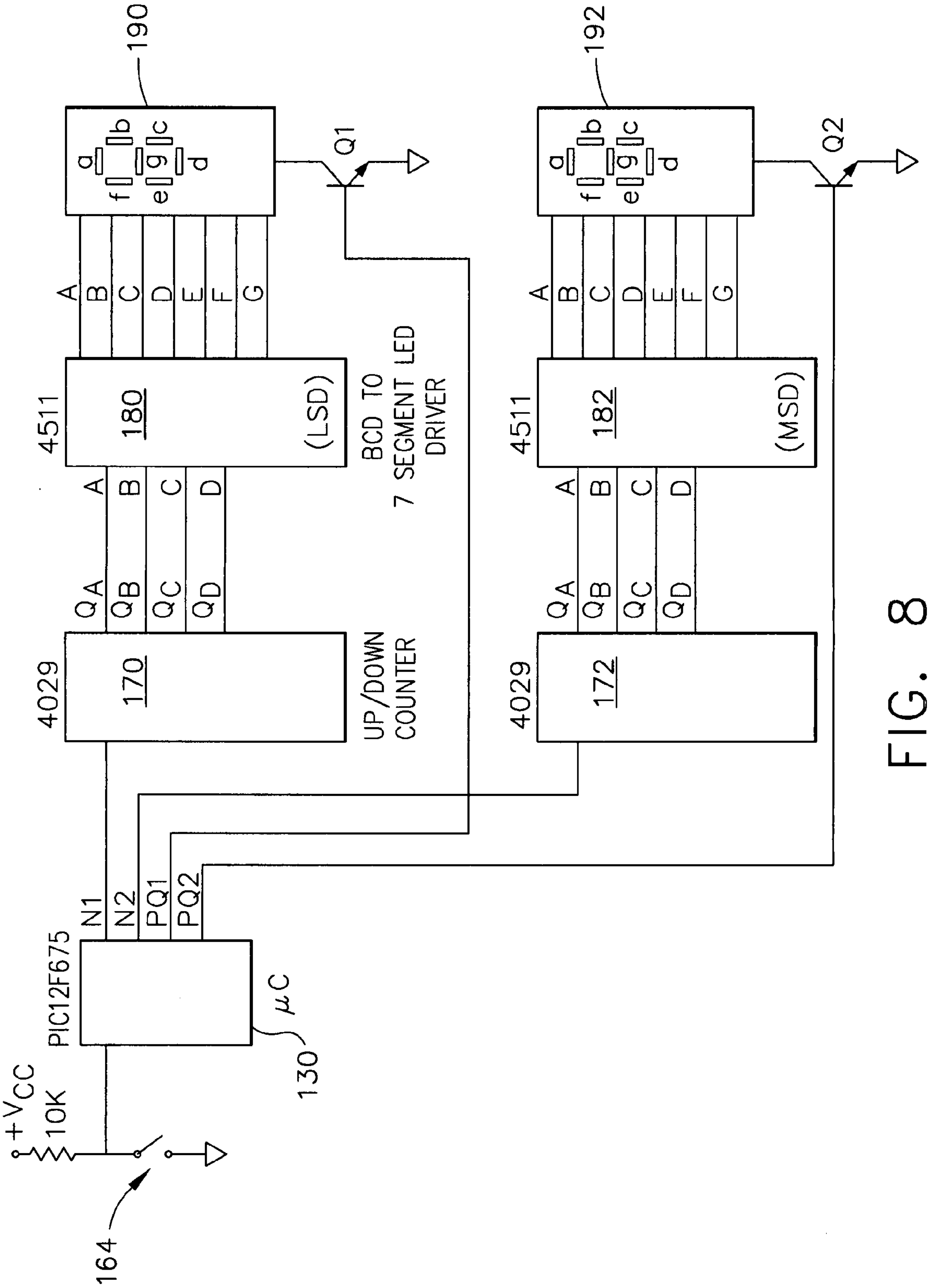
FIG. 8 is an electrical schematic diagram showing an alternative type of user input for the torque limiting control circuit of the present invention.

Referring now to FIG. 8, a schematic diagram is provided to show an alternative circuit that could replace a potentiometer, for use by the user as the torque limit setting. A pushbutton switch 164 could be used by the user as an input to the microcontroller 130. When actuated, the pushbutton switch 164 will cause the microcontroller 130 to set outputs N1 and N2 to a pair of up/down counters 170 and 172. These counters have digital outputs that can control LED drivers. On FIG. 8, a part number 4511 is a BCD to seven-segment LED driver. These LED drivers 180 and 182 then provide outputs that directly drive a seven-segment LED display 190 or 192, respectively.

Microcontroller 130 also has two other outputs, PQ1 and PQ2. These outputs control power transistors Q1 or Q2, respectively. The LED displays 190 and 192 will not be illuminated unless the signals on lines PQ1 and PQ2 are active.

By use of this circuit on FIG. 8, the user can actuate the counters to provide settings between "00" and "99". This, of course, could represent a torque limit setting between 0% and 99%, in which 99% essentially is the maximum possible torque limit value.

Certainly other types of input devices and indication devices could be used to perform this function, without departing from the principles of the present invention. For example, a keypad could be provided with membrane switches, so a user could directly enter numeric values at whatever precision (i.e., number of digits) desired by the tool designer.

If desired, a single tool could be provided with both a torque-limiting control and a depth of drive control, and both types of controls could be adjusted by a user. One control would essentially act as a backup shut-off device for the other control, if desired by the user. In theory, the two above limiter-type controls could be set both to turn off the motor and to interrupt the mechanical final output drive at the exact same instant; but in reality, one control will operate before the other, in real time. On the other hand, the user could set the two limiter-type controls such that one control (e.g., the torque-limiting control) should always act first, and then the other limiter-type control would truly be used as a backup shut-down limiter. However, it should be noted that one type of control may be more repeatable than the other type in some applications. For example, the electronic torque control is often more repeatable in fastening sheet metal-to-sheet metal structures, whereas the depth of drive control is often more repeatable in fastening wood-to-wood structures.

It will be understood that the logical operations described in relation to the flow chart of FIG. 7 can be implemented using sequential logic, such as by using microprocessor technology, or using a logic state machine, or perhaps by discrete logic; it even could be implemented using parallel processors. One preferred embodiment may use a microprocessor or microcontroller (e.g., microcontroller 130) to execute software instructions that are stored in memory cells within an ASIC. In fact, the entire microprocessor or microcontroller, along with RAM and executable ROM, may be contained within a single ASIC, in one mode of the present invention. Of course, other types of circuitry could be used to implement these logical operations depicted in the drawings without departing from the principles of the present invention.

It will be further understood that the precise logical operations depicted in the flow charts of FIG. 7, and discussed above, could be somewhat modified to perform similar, although not exact, functions without departing from the principles of the present invention. The exact nature of some of the decision steps and other commands in these flow charts are directed toward specific future models of hand-held fastener driving tools (those involving DURASPIN® screw driving tools, for example) and certainly similar, but somewhat different, steps might be taken for use with other brands of such tools in many instances, with the overall inventive results being the same.

Some of the mechanical mechanisms described above for the portable screw driving tool 10 has been available in the past from Senco Products, Inc. Some of the components used in the present invention have been disclosed in commonly-assigned patents or patent applications, including a U.S. Pat. No. 5,988,026, titled SCREW FEED AND DRIVER FOR A SCREW DRIVING TOOL; a United States patent application titled TENSIONING DEVICE APPARATUS FOR A BOTTOM FEED SCREW DRIVING TOOL FOR USE WITH COLLATED SCREWS, filed on Sep. 29, 2004, having the Ser. No. 10/953,422, now U.S. Pat. No. 7,032,482; a United States patent application titled SLIDING RAIL CONTAINMENT DEVICE FOR FLEXIBLE COLLATED SCREWS USED WITH A TOP FEED SCREW DRIVING TOOL, filed on Oct. 13, 2004, having the Ser. No. 10/964,099, now U.S. Pat. No. 7,082,857; and a United States patent application titled METHOD AND APPARATUS FOR COOLING AN ELECTRIC POWER TOOL, filed on Dec. 27, 2004, having the Ser. No. 11/023,226.

All documents cited in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A portable fastener-driving tool, comprising:

(a) a housing containing an electric motor, said housing having a driving end that has a fastener driving mechanism proximal thereto, for receiving a collated strip of fasteners and moving a fastener of the collated strip of fasteners to a driving position, said motor providing power to said fastener driving mechanism;

(b) a user-adjustable torque-limiting control device; and (c) a controller circuit that is configured:

(i) to determine an amount of torque being generated by said motor, while actuating one of the fasteners in said driving position;

(ii) to determine a state of said user-adjustable torque-limiting control device; and (iii) to compare said determined amount of torque generated by the motor with said determined state of the user-adjustable torque-limiting control device, and to turn off said motor when said determined amount of torque generated by said motor indicates that said fastener being driven has been sufficiently tightened, based on said determined state of the user-adjustable torque-limiting control device; thereby terminating a fastener driving event;

wherein said comparison between said determined amount of torque generated by the motor and said determined state of the user-adjustable torque-limiting control device further comprises:

(e) calculating a derivative of an electrical current flowing through said motor, versus time;

(f) determining if said derivative of the motor electrical current is greater in absolute magnitude than a predetermined False Reading Setting, and:

(i) if not, terminating said fastener driving event by de-energizing said motor; or (ii) if so, waiting for a predetermined time interval, and then determining if said derivative of the motor electrical current has become a negative value, and:

(A) if so, continuing said fastener driving event; or (B) if not, determining if the motor current now has a magnitude greater than or equal to a current corresponding to said determined state of the user-adjustable torque-limiting control device times an End of Cycle Factor, and:

(1) if not, continuing said fastener driving event; or (2) if so, terminating said fastener driving event by de-energizing said motor.

2. A portable fastener-driving tool, comprising:

(a) a housing containing an electric motor, said housing having a guide rail portion that receives a collated strip of fasteners and directs them toward a driving end of the housing, said driving end of the housing having a fastener driving mechanism proximal thereto that receives said collated strip of fasteners from said guide rail portion and moves a fastener of the collated strip of fasteners to a driving position, said motor providing power to said fastener driving mechanism;

(b) an adjustable torque-limiting control device, said torque-limiting control device being set to a predetermined state by a user; and (c) a controller circuit that is configured to compare an amount of torque being generated by said motor to said predetermined state of the torque-limiting control device, and to turn off said motor when amount of torque is greater than or equal to said predetermined state of the torque-limiting control device;

(d) wherein said controller circuit is further configured:

(i) to calculate a derivative of an electrical current flowing through said motor, versus time; and (ii) to determine if said derivative of the motor electrical current is greater in absolute magnitude than a predetermined False Reading Setting.

3. A portable fastener-driving tool as recited in claim 2, wherein:

(a) said guide rail portion is positioned on an upper surface of said housing; and (b) said guide rail portion comprises a longitudinal pathway having an entry area along said housing upper surface and an exit area proximal to said housing driving end, said collated strip of fasteners being received at said entry area and then directed through said pathway toward said exit area, said collated strip of fasteners being directed from said exit area toward said fastener driving mechanism.

4. The portable fastener-driving tool as recited in claim 2, wherein said controller circuit comprises:

(a) a current sensing circuit for determining a magnitude of said electrical current flowing through said motor;

(b) an input stage that detects a state of said user-adjustable torque-limiting control device;

(c) an output stage for controlling the magnitude of said current flowing through said motor; and (d) a processing circuit that is configured to interface to said input stage and said current sensing circuit, and is configured to drive a gating signal to said output stage.

5. The portable fastener-driving tool as recited in claim 4, wherein said controller circuit further comprises:

(e) a peak-to-peak detector circuit to determine an AC magnitude of said current flowing through said motor; and (f) a zero voltage crossing detector to determine appropriate starting and stopping times for driving said gating signal.

6. A portable fastener-driving tool, comprising:

(a) a housing containing an electric motor, said housing having a first end and a second end, said housing including a first intermediate drive device that translates movement from said motor toward said second end;

(b) a detachable nose sub-assembly having a third end and a fourth end, in which said third end is positioned proximal to said second end of the housing when attached thereto, said third end including a second intermediate drive device that in is mechanical communication with said first intermediate drive device when said housing is attached to said detachable nose sub-assembly, said fourth end of the nose sub-assembly including a fastener driving mechanism that is in mechanical communication with said second intermediate drive device, used for driving a fastener into an object;

(c) an adjustable torque-limiting control device, said torque-limiting control device being set to a predetermined state by a user; and (d) a controller circuit that is configured to compare an amount of torque being generated by said motor to said predetermined state of the torque-limiting control device, and to turn off said motor when amount of torque is greater than or equal to said predetermined state of the torque-limiting control device;

wherein said comparison between said amount of torque generated by the motor and said predetermined state of the user-adjustable torque-limiting control device further comprises:

(e) calculating a derivative of an electrical current flowing through said motor, versus time;

(f) determining if said derivative of the motor electrical current is greater in absolute magnitude than a predetermined False Reading Setting, and:

(i) if not, de-energizing said motor; or (ii) if so, waiting for a predetermined time interval, and then determining if said derivative of the motor electrical current has become a negative value, and:

(A) if so, continuing said fastener driving event; or (B) if not, determining if the motor current now has a magnitude greater than or equal to a current corresponding to said predetermined state of the user-adjustable torque-limiting control device times an End of Cycle Factor, and:

(1) if not, continuing said fastener driving event; or (2) if so, de-energizing said motor.

* * * * *